United States Patent [19]

Ohkawa et al.

[11] Patent Number: 5,796,708
[45] Date of Patent: Aug. 18, 1998

[54] OPTICAL RECORDING MEDIUM AND RECORDING SYSTEM

[75] Inventors: Hideki Ohkawa; Motonari Matsubara; Tomohisa Yoshimaru, all of Yokohama; Nobuhisa Yoshida, Zushi; Satoru Koyahara, Yokohama, all of Japan

[73] Assignee: Kabushiki Kaisha Toshiba, Kawasaki, Japan

[21] Appl. No.: 556,992

[22] PCT Filed: Jun. 11, 1993

[86] PCT No.: PCT/JP93/00782

§ 371 Date: Nov. 8, 1995

§ 102(e) Date: Nov. 8, 1995

[87] PCT Pub. No.: WO94/29856

PCT Pub. Date: Dec. 22, 1994

[51] Int. Cl.$^6$ .................................................. G11B 7/00
[52] U.S. Cl. .................... 369/283; 369/100; 369/275.5
[58] Field of Search ........................... 369/275.2, 275.3, 369/275.4, 275.5, 285.5, 97, 100, 284

[56] References Cited

U.S. PATENT DOCUMENTS

| | | |
|---|---|---|
| 4,477,819 | 10/1984 | Lee et al. |
| 4,587,533 | 5/1986 | Nakane et al. |
| 4,670,345 | 6/1987 | Morimoto et al. |
| 4,682,321 | 7/1987 | Takaoka et al. |
| 4,737,408 | 4/1988 | Kuwahara et al. |
| 4,772,897 | 9/1988 | Ohkawa. |
| 4,847,132 | 7/1989 | Takao et al. |
| 4,975,355 | 12/1990 | Suzuki ............... 430/346 |
| 5,003,526 | 3/1991 | Bailey ............... 369/59 |
| 5,088,075 | 2/1992 | Yokota ............... 369/32 |
| 5,155,719 | 10/1992 | Masakawa. |

FOREIGN PATENT DOCUMENTS

| | | |
|---|---|---|
| 0 132 410 A3 | 1/1985 | European Pat. Off. |
| 1 150 829 A1 | 8/1985 | European Pat. Off. |
| 0 337 445 A3 | 10/1989 | European Pat. Off. |
| 0 345 752 A2 | 12/1989 | European Pat. Off. |
| 0 376 700 A2 | 7/1990 | European Pat. Off. |
| 0 420 209 A2 | 4/1991 | European Pat. Off. |
| 0 469 727 A1 | 2/1992 | European Pat. Off. |
| 0 541 376 A1 | 5/1993 | European Pat. Off. |
| 2 575 857 A1 | 7/1986 | France. |
| WO 91/10993 | 7/1991 | WIPO. |

OTHER PUBLICATIONS

K. Fumio, Magneto–Optical Recording Medium, Patent Abstract of Japan, 13(590):P–984 (1989).
Omori Yasushi et al., Lamination Method For Optical Disk, Patent Abstracts of Japan, 12(408):P–788 (1988).
Omori Yasushi et al., Manufacture of Stuck Optical Disk, Patent Abstracts of Japan, 11(144):P–574 (1987).
Ando Keikichi et al., Member For Information Recording, Patent Abstracts of Japan, 16(511):P–1441 (1992).

*Primary Examiner*—Muhammad N. Edun
*Attorney, Agent, or Firm*—Finnegan, Henderson, Farabow, Garrett & Dunner, L.L.P.

[57] ABSTRACT

An optical disc is constructed for operation in an alloying mode and includes first recording sublayer of Ge—Sb—Te and a second recording sublayer of Bi—Te. Apparatus is provided for recording information on an optical disc in the alloying mode or phase transformation mode in accordance with disc type information associated with the disc and readably by the apparatus. There is also provided an environmental aging technique for use in constructing optical discs to obviate significant dimensional changes in the discs during use between the extremes of the operating environment. There is further provided an optical disc construction and method in which an inorganic dielectric deposited on an organic substrate includes a hydrocarbon. There is additionally provided an optical disc construction and method in which a plasma polymer layer is disposed between an inorganic dielectric layer over the recording layer and a resin layer.

16 Claims, 12 Drawing Sheets

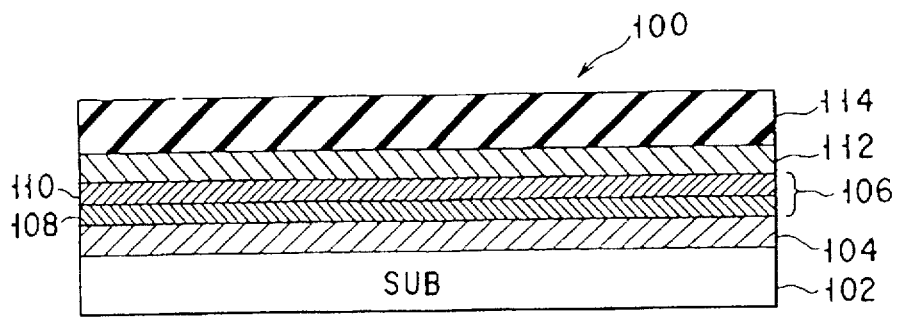
F I G. 1
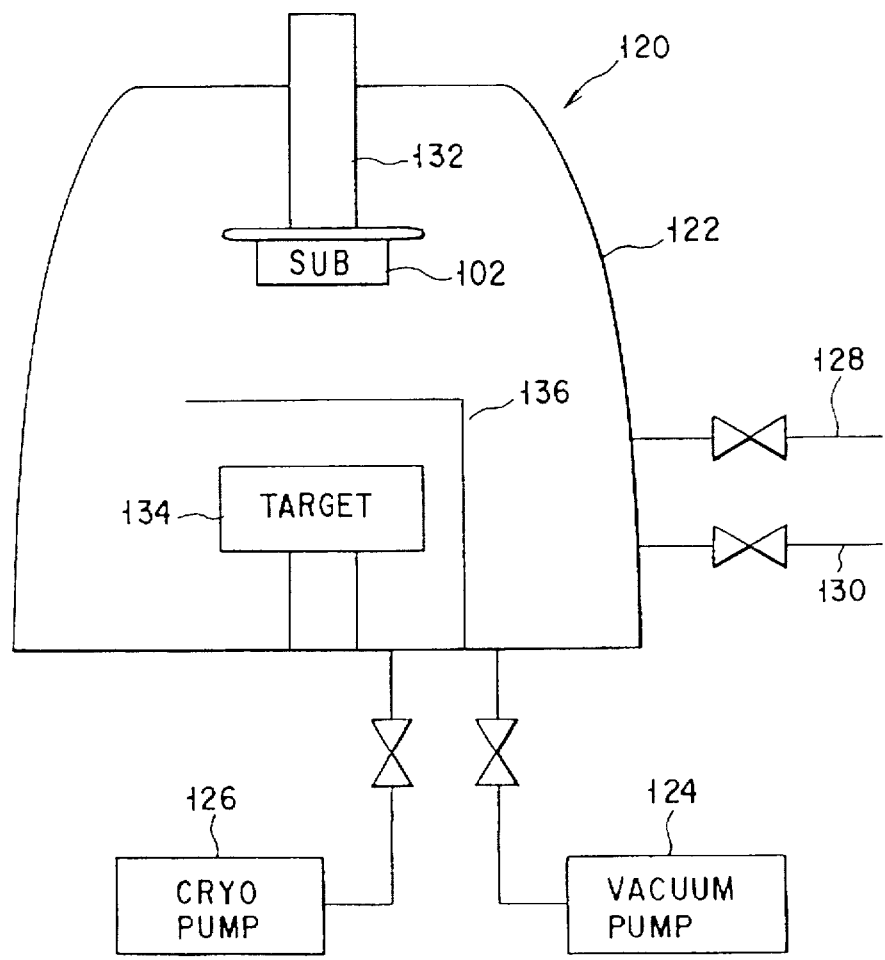
F I G. 2

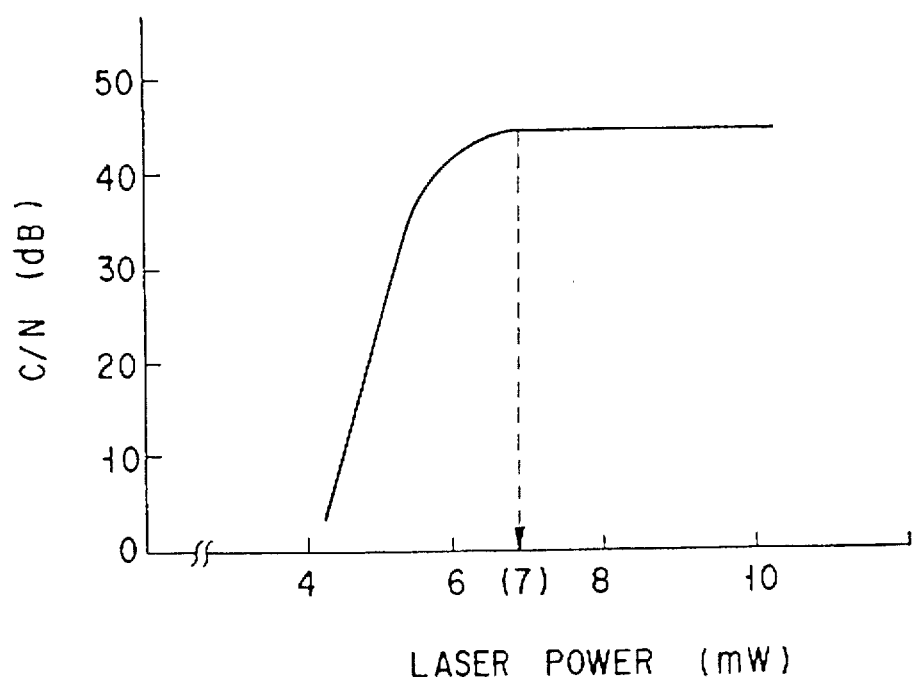
F I G. 3

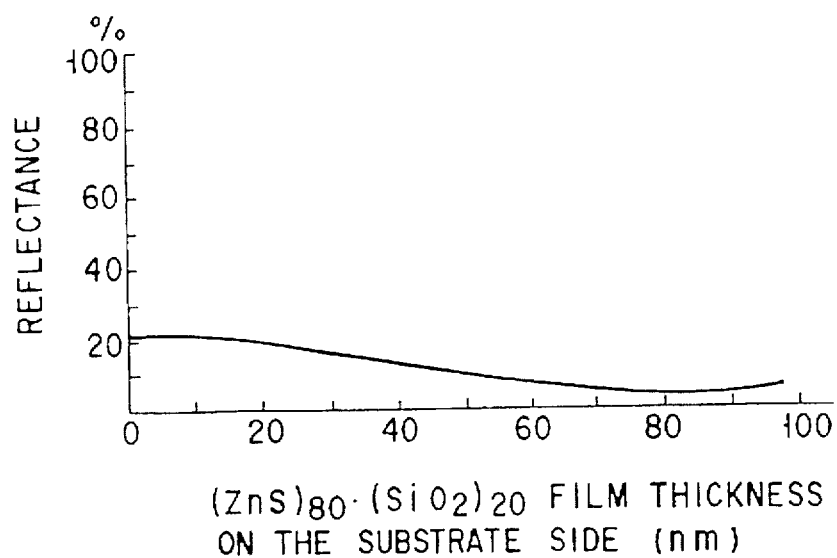
F I G. 5
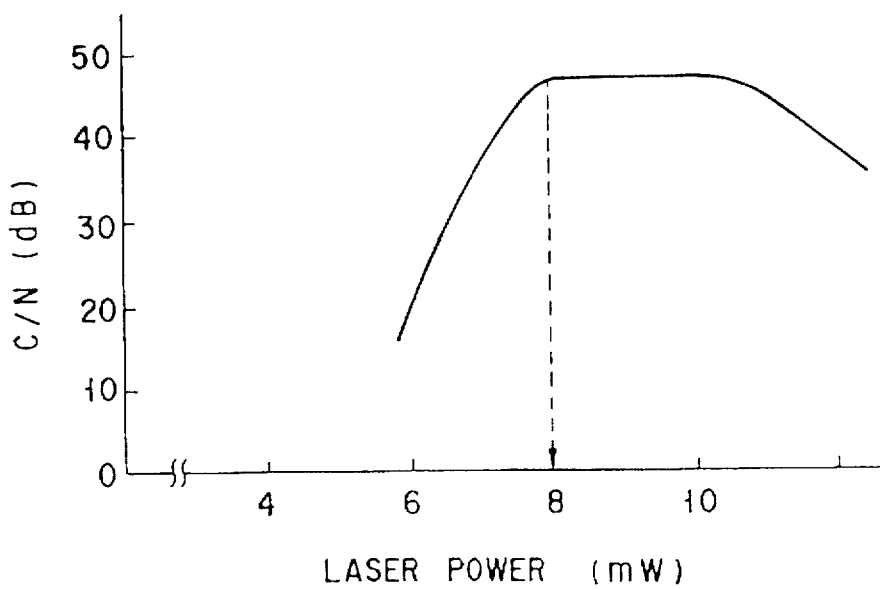
F I G. 6

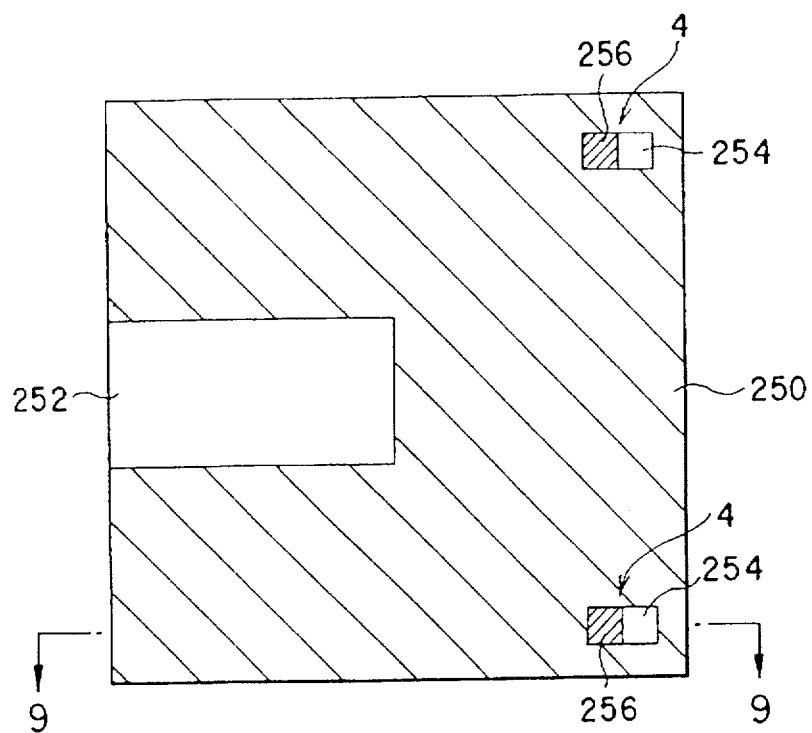
F I G. 8
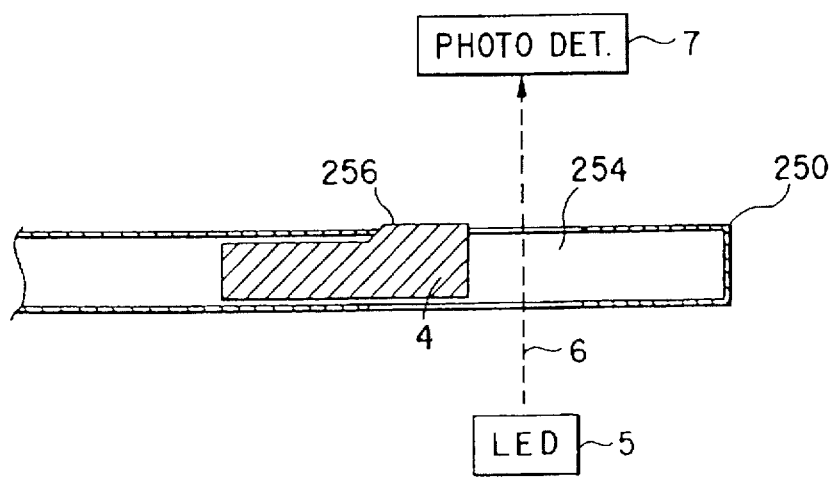
F I G. 9

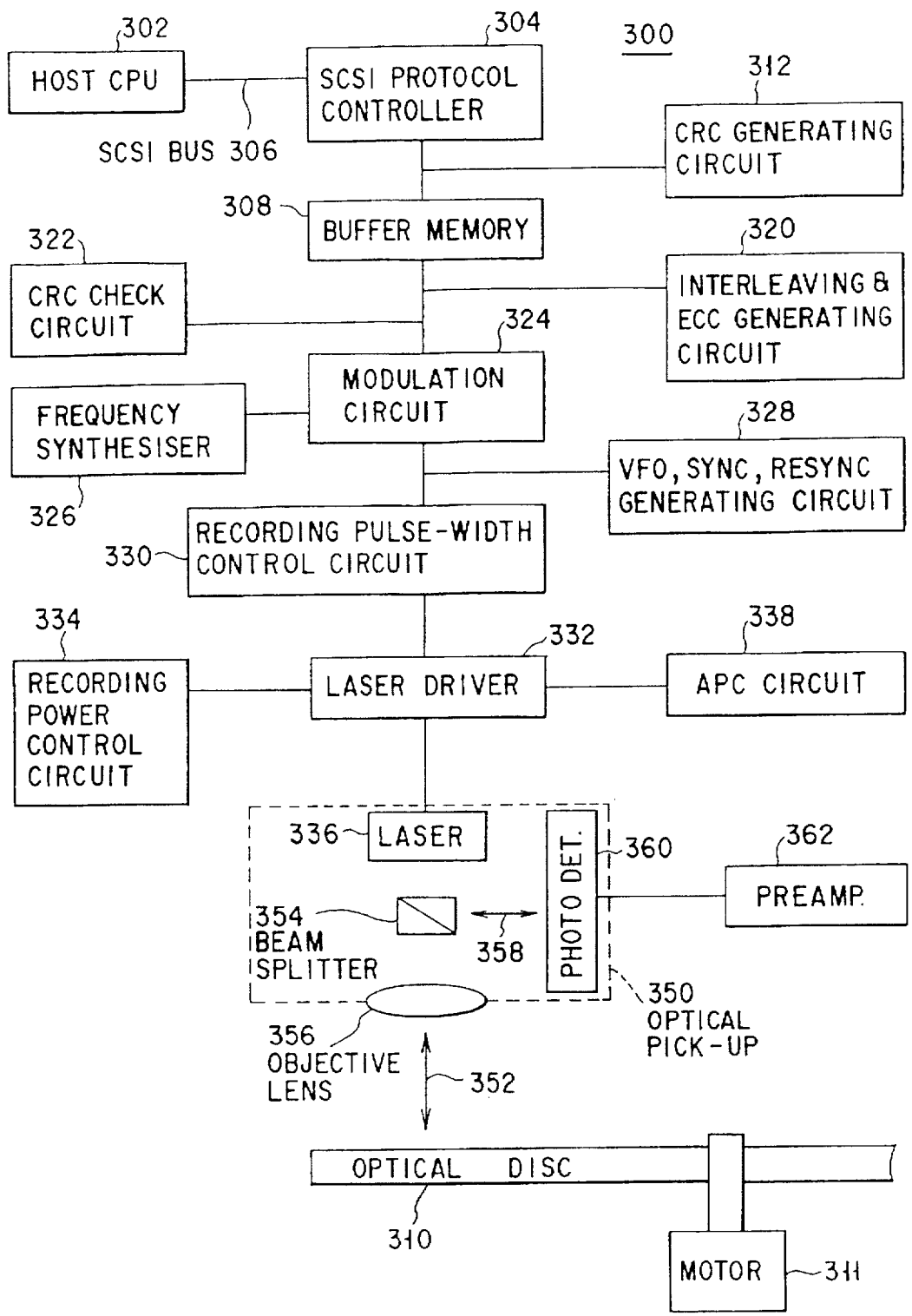
F I G. 10

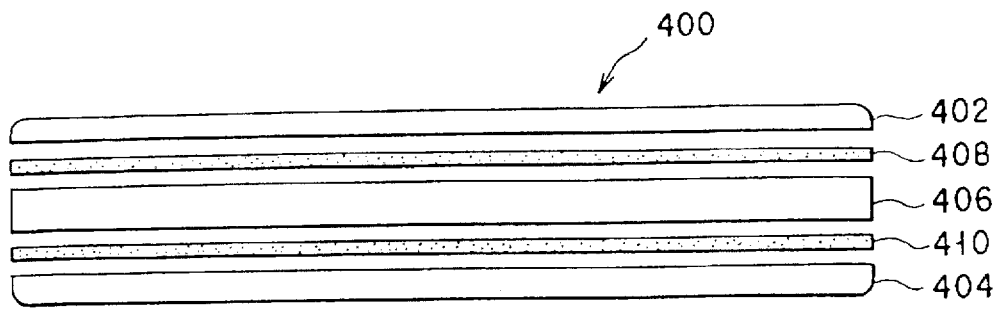
F I G. 11
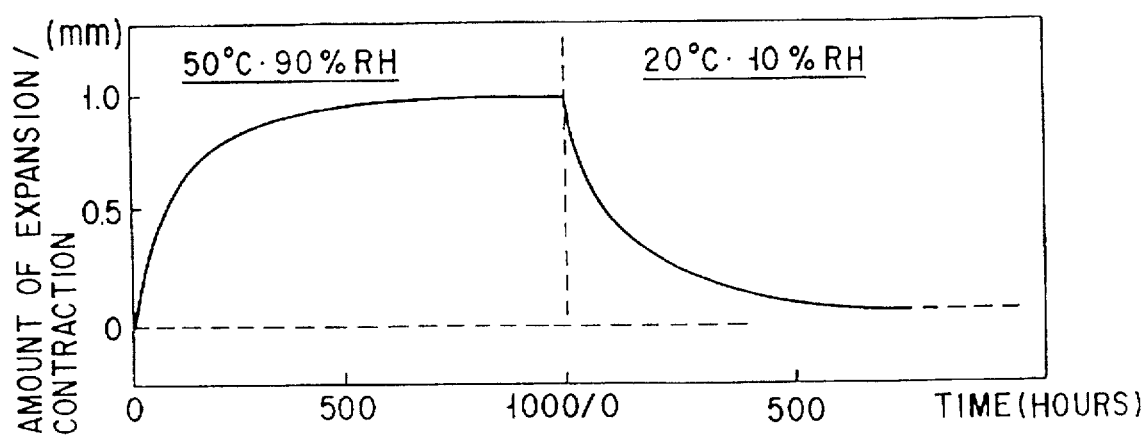
F I G. 12

OPTICAL RECORDING MEDIUM AND RECORDING SYSTEM

The present invention is directed in general to optical recording media and systems for recording on such media. More particularly, the present invention is directed to optical media for recording in phase transformation and alloying modes and a system for recording on such media, as well as certain improved optical media constructions.

The alloying mode for recording on optical recording media is one of several different recording modes. In accordance with the alloying mode, the optical recording medium includes lower and upper discrete layers of recording material, one deposited on top of the other on a transparent substrate. As a result, the lower of the two recording layers is presented to a recording or reading laser beam and has a characteristic reflectance. Upon irradiation with a recording laser beam of appropriate power level, the two layers in the region of the irradiation are heated sufficiently to at least partially form an alloy of the materials constituting the lower and upper discrete recording layers. The alloyed portion has a reflectance different from that of the lower layer. The difference in reflectance between the alloyed portions corresponding to recorded information and the unrecorded portions corresponding to the lower recording layer enables reading of the recorded data. Commonly assigned U.S. Pat. No. 4,682,321 discloses an optical recording medium for use in the alloying mode and is incorporated herein by reference.

In designing an optical recording medium, one problem is the selection of recording layer materials which provide a significant difference in reflectance between recorded, i.e., alloyed, and unrecorded portions. The problem of selecting suitable recording materials is further subject to a consideration regarding the desirability to utilize a high recording data rate, which results in a short time duration of exposure to the recording laser beam. Such short duration exposure can limit the extent of alloying and thereby disadvantageously limit the amount by which the reflectance changes due to the alloying. Conversely, the need to provide a relatively long duration exposure to the recording laser beam to ensure proper alloying, undesirably limits the recording data rate.

The phase transformation mode is another of the conventional optical recording modes. In accordance with the phase transformation mode, the optical recording medium includes a single recording layer which may be in a predominantly amorphous or crystalline phase state, depending on the material and the manner of its deposition. Upon irradiation with a recording laser beam of appropriate power level, the irradiated portion transforms its phase state. As a function of the recording material, the reflectances of amorphous and crystalline portions are different, so that the phase transformed portions correspond to recorded information. Commonly assigned U.S. Pat. No. 4,975,355 discloses an optical recording medium for use in the phase transformation mode and is incorporated herein by reference.

It is the present inventors' experience that a constraint on the practice of the phase transformation mode is the need to control the power level of the recording laser beam. They have observed that when higher recording laser power levels are used for the recording layer being in amorphous state, the quality of the recorded signal deteriorates.

Thus, practice of the phase transformation mode includes recording laser power level considerations which are generally different from those of the alloying mode. As a result, it is difficult to utilize the same recording device for recording in both modes, without making some adjustment to the device dependent upon the type of recording mode to be practiced.

Optical recording media in the form of optical discs, whether for practice of the phase transformation mode, alloying mode or other modes, can experience several different structural problems. For example, plastic materials such as acrylic and polycarbonate, are widely used for making disc substrates. Such materials are known to absorb moisture from their environment and to expand or contract as a function of such moisture absorption as well as the environmental temperature. Since the temperature and humidity characteristics of the typical storage and use environments can vary over a significant range, a corresponding significant change in physical dimensions of the substrate can occur. Such dimensional changes can adversely affect the ability to accurately read information from the disc. Such changes can also cause difficulties in two-sided optical discs which include two substrates either bonded together or to a reinforced plate. The expansion or contraction of each disc resulting from changes in environmental conditions can cause generation of stresses within the disc which cannot be relieved. Warping of the complete disc assembly can result from such stresses.

Another example of a structural problem experienced with optical discs utilizing plastic substrates occurs in cases where an inorganic protective layer is interposed between the plastic substrate and the recording layer. Inorganic oxides, sulfides, nitrides and mixtures thereof are generally used as the protective layer. More particularly, mixtures of ZnS and $SiO_2$ have been found to have desirable properties for use as a protective layer. A particular problem experienced with such constructions is that the adhesion between the plastic substrate and the protective layer is insufficient.

A further structural problem experienced with optical discs occurs in cases where an inorganic protective layer is provided over the recording layer and an organic resin layer is provided over the protective layer. The resin layer is typically applied over the protective layer by a spin coating process. A particular problem experienced with this type of construction is that the adhesion between the protective layer and the resin layer is insufficient.

SUMMARY OF THE INVENTION

The present invention has been made in view of the above circumstances and has as an object to provide optical recording media and an optical recording system which are not subject to the aforementioned problems and disadvantages.

It is another object of the present invention to provide an optical recording medium for use in the alloying mode, which can be utilized for recording at a high data rate.

It is a further object of the present invention to provide an optical recording system in which a single recording device can be used to record in at least the phase transformation and alloying modes.

It is an additional object of the present invention to provide a method of disc construction which minimizes warping of the disc when subsequently exposed to a range of environmental conditions.

It is yet another object of the present invention to provide an optical disc in which suitable adhesion is achieved between a plastic substrate and an inorganic protective layer deposited thereon.

It is yet a further object of the present invention to provide an optical disc including an inorganic protective layer and a resin layer thereover, with the resin layer being bonded to the disc with suitable adhesion.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an apparatus for recording information on an optical recording medium which includes type information identifying a recording type of the recording medium, comprises a generator for generating a layer beam; a detector for detecting the recording type of the recording medium so as to generate a representative recording type signal; and a controller, coupled to receive the information to be recorded on the recording medium and responsive to the recording type signal, for controlling the generator to generate the laser beam to record the information at a power level predetermined to be appropriate for the recording type of the recording medium.

An optical recording medium for recording information in the present invention comprises a substrate; and a recording layer formed of a first sublayer disposed on a predetermined portion of the substrate and a second sublayer disposed on the first sublayer. The first sublayer is substantially composed of a mixture of Ge, Sb, and Te, and the second sublayer is substantially composed of a mixture of Bi and Te. The first and second sublayers can be at least partially converted into a signal alloy layer when irradiated with a laser beam, and information can be recorded by the at least partial conversion.

A system for recording information on an optical recording medium in the present invention comprises an apparatus for recording information on the optical recording medium, which includes means for recording on the optical medium with a laser beam, means for reading information associated with the optical medium, and means for controlling a power level of the laser beam according to a recording type of the optical medium. The optical medium comprises a substrate; a recording layer where information can be recorded with a laser beam; and means, associated with the optical medium and readable by the reading means of the apparatus, for identifying the recording type of the medium. Upon use of the optical medium with the apparatus, the reading means can read the identifying means to determine the recording type of the optical medium and the controlling means can control the power level of the laser beam according to the recording type.

An optical recording medium for recording information in the present invention comprises a substrate composed of an organic material; a first protective layer disposed on the substrate and substantially composed of a material selected from a group consisting of a mixture in the range from $(ZnS)_{80}(SiO_2)_{20}$ to $(ZnS)_{20}(SiO_2)_{80}$, a mixture in the range from $(ZnS)_{80}(Sin)_{20}$ to $(ZnS)_{20}(SiN)_{80}$ and a mixture in the range from $(ZnS)_{80}(Al_2O_3)_{20}$ to $(ZnS)_{20}(Al_2O_3)_{80}$; a recording layer comprising a first sublayer disposed on a predetermined portion of the substrate and a second sublayer disposed on the first sublayer, wherein the first sublayer has a composition on a line connecting $Sb_2Te_3$ and GeTe on a ternary Ge—Sb—Te composition diagram, and the second sublayer having a composition $Bi_2Te_3$; a second protective layer disposed on the recording layer and substantially composed of a material selected from a group consisting of a mixture in the range from $(ZnS)_{80}(SiO_2)_{20}$ to $(ZnS)_{20}(SiO_2)_{80}$, a mixture in the range from $(ZnS)_{80}(SiN)_{20}$ to $(ZnS)_{20}(SiN)_{80}$ and a mixture in the range from $(ZnS)_{80}(Al_2O_3)_{20}$ to $(ZnS)_{20}(Al_2O_3)_{80}$; and a resin layer disposed on the second protective layer.

An optical recording medium for recording information in the present invention comprises a substrate composed of a first organic material; a protective layer disposed on at least a portion of the substrate; a layer of recording material disposed on the protective layer; and the protective layer being composed of an inorganic material and a second organic material for enhancing bonding between the protective layer and the substrate. The inorganic material is substantially composed of a material selected from the group consisting of a mixture in the range from $(ZnS)_{80}(SiO_2)_{20}$ to $(ZnS)_{80}(SiO_2)_{20}$, a mixture in the range from $(ZnS)_{80}(SiN)_{20}$ to $(ZnS)_{20}(SiN)_{80}$ and a mixture in the range from $(ZnS)_{80}(Al_2O_3)_{20}$ to $(ZnS)_{20}(Al_2O_3)_{80}$, and the second organic material is a hydrocarbon.

A optical recording medium for recording information in the present invention comprises a substrate; an inorganic protective layer; a recording layer between the substrate and the protective layer; an organic plasma polymer film disposed on the protective layer; and an organic region protecting layer disposed on the polymer film.

BRIEF DESCRIPTION OF THE DRAWINGS

The accompanying drawings, which are incorporated in and constitute a part of the specification illustrate embodiments of the invention and, together with the description, serve to explain the objects, advantages, and principles of the invention. In the drawings, FIG. 1 illustrates a cross-sectional view of an optical disc constructed in accordance with an embodiment of the invention;

FIG. 2 diagrammatically illustrates a sputtering apparatus used in constructing the disc illustrated in FIG. 1;

FIG. 3 illustrates a plot of carrier-to-noise ratio (C/N) as a function of recording laser power for an optical disc constructed in accordance with Example 1;

FIG. 5 illustrates a plot of recording layer reflectance as a function of protective layer thickness in an optical disc of the type illustrated in FIG. 1;

FIG. 6 illustrates a plot of C/N as a function of recording laser power for a disc constructed for recording in a phase transformation mode;

FIG. 8 illustrates a cartridge case, for an optical disc, including means for identifying the disc type mounted therein;

FIG. 9 is section 9—9 denoted in FIG. 8;

FIG. 10 diagrammatically illustrates recording apparatus in accordance with an embodiment of the present invention;

FIG. 11 illustrates a two-sided disc constructed in accordance with an embodiment of the present invention;

FIG. 12 illustrates a plot of optical disc substrate expansion and contraction under different environmental conditions;

DETAILED DESCRIPTION OF THE PREFERRED EMBODIMENTS

Figure 4:
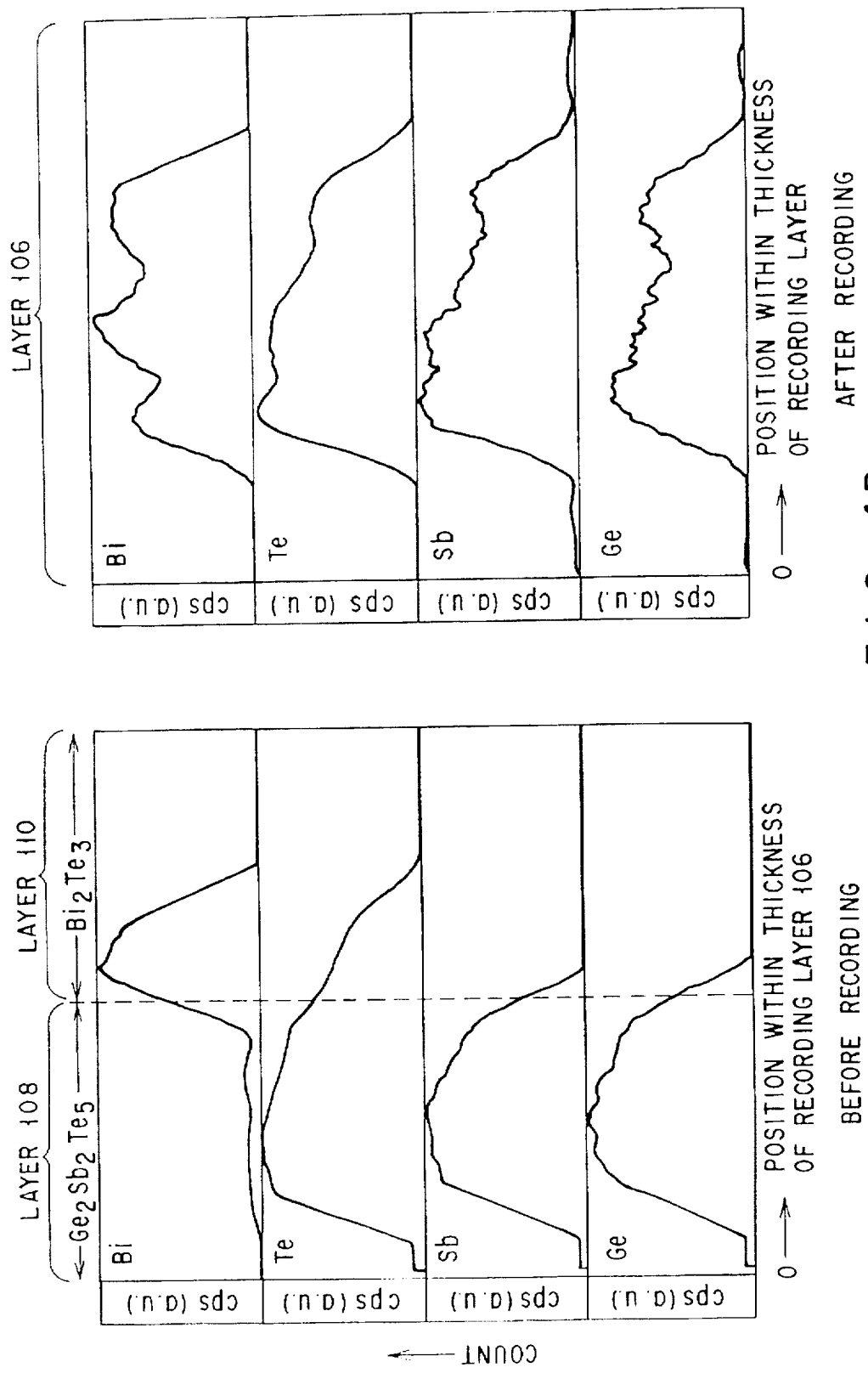
FIGS. 4A and 4B illustrate results of energy dispersive X-ray analysis of a recording layer cross section before and after recording, respectively.

Referring now to the drawings, FIG. 1 illustrates a cross-sectional view of an optical disc 100 suitable for recording in the alloying mode, constructed in accordance with an embodiment of the invention.

Disc 100 includes a substrate 102 preferably composed of plastic material such as polymethylmethacrylic (PMMA) resin, acrylic, polycarbonate. A protective layer 104 composed of a dielectric inorganic material is disposed on substrate 102. Layer 104 is preferably composed of a mixture of ZnS and $SiO_2$ in the range from $(ZnS)_{80}(SiO_2)_{20}$ to $(ZnS)_{20}(SiO_2)_{80}$. Substrate 102 and protective layer 104 are required to be substantially optically transparent in a range of wavelength of the recording and reading laser beams, e.g., 400 to 900 nanometers(nm).

Protective layer 104 should remain mechanically stable and non-deforming, even upon exposure to the high temperatures occurring during laser recording. The present inventors experimented with the use of protective layer compositions of only ZnS and found its mechanical stability inferior to a mixture of ZnS and $SiO_2$. Further, based on such experimentation it was found that deformation experienced due to recording was especially low for mixtures in the range from $(ZnS)_{80}(SiO_2)_{20}$ to $(ZnS)_{50}(SiO_2)_{50}$.

A recording layer 106 is disposed on layer 104 and consists of a lower recording sublayer 108 composed of Ge—Sb—Te and an upper recording sublayer 110 composed of Bi—Te. Layer 104 isolates the recording layers (108, 110) from the plastic substrate (102) to prevent degradation of the recording layer, e.g., by corrosion, that may otherwise result from contact with the substrate.

A protective layer 112 is disposed on recording sublayer 110 and preferably has substantially the same composition as protective layer 104. An organic resin layer 114 is disposed on protective layer 112 and is preferably composed of an ultraviolet curing material comprising, for example, an acrylic monomer mixed, prior to curing, with a photopolymerization initiator.

A method for the construction of discs 100 begins with providing substrate 102. Optical discs can be constructed to have any one of several different diameters according to known formats. The thickness of the substrate corresponding to each such diameter is as conventionally practiced. Substrate 102 is provided with a pre-groove for guiding the recording or reading laser, as known in the art. Protective layer 104 is deposited on substrate 102 by sputtering.

FIG. 2 diagrammatically illustrates a sputtering apparatus 120 for performing the deposition. Device 120 includes a vacuum chamber 122, a rotary type vacuum pump 124 connected through a valve to vacuum chamber 122, a cryo pump 126 connected through a valve to vacuum chamber 122, valved lines 128 and 130 for introducing gases into or exhausting gases from chamber 122, a holder 132 for holding substrate 102 onto which the deposition is being conducted, a target 134 containing the material to be sputtered onto substrate 102, and a shutter 136 which can be opened to expose the substrate to target 134 during the sputtering operation.

The apparatus 120 also includes a high frequency power source, not shown, for application to target 134 to turn on the glow discharge of the target material to deposit onto substrate 102.

In order to deposit layer 104 as the preferred mixture of ZnS and $SiO_2$, target 134 is provided either as two separate components respectively consisting of ZnS and $SiO_2$ or as a mixture of ZnS and $SiO_2$. For example, the mixture can be provided with the molar ratio $ZnS:SiO_2=70:30$. Rotary pump 124 is operated to reduce the pressure in chamber 122 to approximately 0.2 Torr. Then cryo pump 126 is operated to achieve a desired degree of vacuum, e.g., approximately less than $1\times10^{-5}$ Torr. Next an inert gas such as argon is introduced through line 128 while the high frequency voltage is applied to target 134. When the discharge of target 134 has stabilized, shutter 136 is opened and the mixture of ZnS and $SiO_2$ is deposited as layer 104 on substrate 102. Layer 104 is preferably deposited to have a thickness in the range from 5 nm to 20 nm and preferably 5 nm to 10 nm.

Next, recording sublayer 108 is deposited on layer 104 by sputtering in device 120. Chamber 122 is appropriately evacuated and target 134 is provided having a composition $Ge_{22}Sb_{22}Te_{56}$. In one example, a target having a diameter of 4 inches (102 mmφ) was used. The radio frequency power supply is operated to impress 70 W of power on target 134 while argon gas is introduced through line 128. Shutter 136 is opened to enable deposition of layer 108 onto layer 104 to achieve a thickness in the range from 30 nm to 60 nm and preferablly 35 nm to 50 nm. When target 134 is provided with the above noted composition, layer 108 has a composition on a line connecting $Sb_2Te_3$ and GeTe on a ternary Ge—Sb—Te composition diagram. For example, the compositions $Ge_2Sb_2Te_5$, $GeSb_4Te_7$, and $GeSb_2Te_4$ occur on this line.

Next, recording layer 110 is deposited on layer 108 by sputtering in apparatus 120. Chamber 122 is appropriately evacuated and target 134 is provided having a composition, $Bi_2Te_3$. In one example, a target having a diameter of 5 inches (127 mmφ) was used. The radio frequency power supply is operated to impress 70 W of power on target 134 while argon gas is introduced through line 128. Shutter 136 is opened to enable deposition of layer 110 onto layer 108 to achieve a thickness in the range from 20 nm to 50 nm and preferably 30 nm to 40 nm. When target 134 is provided with the above noted composition, layer 110 has a composition $Bi_2Te_3$.

It is noted that in place of target 134, apparatus 120 can be provided with multiple targets which can be separately exposed by shutter 136 and to which the radio frequency power supply can be separately applied. As a result, successive depositions can be conducted within apparatus 120 without the need to open the chamber to change target 134, or to completely reevacuate the chamber before the subsequent deposition.

Next, protective layer 112 is deposited onto layer 110 in a manner substantially the same as described above for layer 104.

Lastly, resin layer 114 is deposited by a spin coating process as an ultraviolet curing material such as the above noted acrylic monomer mixed with a photopolymerization initiator. Then the deposited layer is subjected to ultraviolet radiation to result in curing. Layer 114 is deposited to have a thickness in the range from 5 μm to 20 μm and preferably to a thickness of approximately 10 μm.

EXAMPLE I

An alloying mode disc was constructed by the method described above. The layer thickness can be defined by a conduct of multiple interference conditions and was subjected to a recording operation utilizing an 830 nm recording laser beam focused through an objective lens having a numerical aperture of 0.55. The recording laser beam was generated to have a pulse width of 60 nanoseconds (ns) while the optical disc was rotated at a linear velocity of 5 m/s, and the recording frequency was kept at 1 MHz. The recording laser beam power was varied to investigate its effect on recording quality.

FIG. 3 illustrates a plot of carrier-to-noise ratio (C/N) as a function of recording laser power, for a fixed reading laser beam power. As seen in FIG. 3, a satisfactory C/N of approximately 45 dB was achieved and maintained for laser power levels in excess of approximately 7 mW. It was observed that reflectance in recorded portions of layer 106 was approximately twice the reflectance in unrecorded portions.

Cross sections of recording layer 106 before and after recording were observed with a transmission electron microscope. These observations showed that the interface between layers 108 and 110 disappeared as a result of irradiation with the recording laser beam.

FIGS. 4A and 4B illustrate results of analysis of the physical distribution of the elements across a cross section of recording layer 106 before and after recording, respectively, using an energy-dispersive X-ray analyzer. As seen in FIGS. 4A and 4B, all four elements originally contained in layers 108 and 110 became uniformly distributed across layer 106, thereby indicating that complete alloying occurred as a result of recording.

EXAMPLE II

Several optical disc samples were constructed generally using the method described above for the construction of disc 100. Each disc included a plastic substrate on which was formed, in order, a first protective layer of $(ZnS)_{80}(SiO_2)_{20}$, a first recording sublayer of $Ge_{24}Sb_{22}Te_{54}$, a second recording sublayer of $Bi_2Te_3$, and a second protective layer of $(ZnS)_{80}(SiO_2)_{20}$. The thickness of the first layer of $(ZnS)_{80}(SiO_2)_{20}$ corresponding to layer 104 in FIG. 1, was varied among the samples in order to assess the effect of the layer thickness on reflectance of the recording layer. In particular, it was expected that the multiple internal reflection effect would vary with the thickness of layer 104. The reflectance was only measured using a laser beam wavelength of 780 nm.

FIG. 5 illustrates a plot of recording layer reflectances as a function of the thickness of layer 104. As seen in the plot, there does not appear to be any significant effect due to layer thickness for thicknesses of 10 nm or less and only minimal adverse effect for thicknesses up to 20 nm.

As previously noted, optical recording media for use in the phase transformation mode is subject to a constraint on the recording laser power level. The present inventors have observed that this is especially true in the case in which the recording layer is in the amorphous state prior to recording, so that the recording laser beam transforms the irradiated portions into the crystalline state.

When the power level is excessive, a retransformation from the crystalline state back to the amorphous state can occur within a portion of the region irradiated by the recording laser beam. This retransformation tends to reduce the difference in reflectance between the irradiated and nonirradiated portions of the recording layer. This reduction of the difference in reflectance adversely affects the ability to subsequently read the recorded data.

For example, an optical disc for use in the phase transformation mode was constructed having a single recording layer of Ge—Sb—Te, that layer being in the amorphous state prior to recording. Information was recorded on the disc using an 830 nm laser beam focused through an objective lens having a numerical aperture of 0.55. The recording laser was generated to have a pulse width of 60 ns while the optical disc was rotated at a linear velocity of 5 m/s, the recording data frequency was kept at 1 MHz.

FIG. 6 is a plot of C/N as a function of recording laser beam power, for a fixed reading laser beam power. As seen in FIG. 6, a satisfactory C/N of approximately 45 dB is achieved in a limited range of recording beam power of 8 mW–10 mW. It was confirmed that the reduction in C/N above 10 mW beam power was due to the retransformation effect described above, by using a TEM (transmission electron microscopy) observation.

It is noted that while a C/N characteristic such as illustrated in FIG. 6 indicates a need to control laser power when this type of optical disc is employed, it does not necessarily define a precise range of power for all data rates and recording techniques. One recording technique for which further consideration of adjusting laser power is necessary is the pulse width modulation (PWM) technique. A description of this techniques is provided in U.S. Pat. No. 5,003,526 which is incorporated herein by reference. In accordance with the PWM technique, data is encoded in accordance with the length of irradiated regions on the disc. It is the present inventors' experience that when practicing PWM recording on a phase transformation type disc, the laser power must be adjusted as a function of pulse length in order to avoid occurrence of retransformation.

In accordance with an embodiment of the present invention and as described more fully below, there is provided recording apparatus and a system for recording on both phase transformation and alloying mode type optical discs. The recording apparatus determines the type of the disc on which data is to be recorded and adjusts the laser power level as a function of the disc type.

In order to enable the recording apparatus to determine the type of disc being recorded on, each disc for use in the system preferably has associated therewith an indication of its type. In accordance with one technique for identifying the disc type, the disc has in the substrate thereof rows of pits formed in its inner or outer periphery, in a region not normally utilized for data recording.

Figure 7:
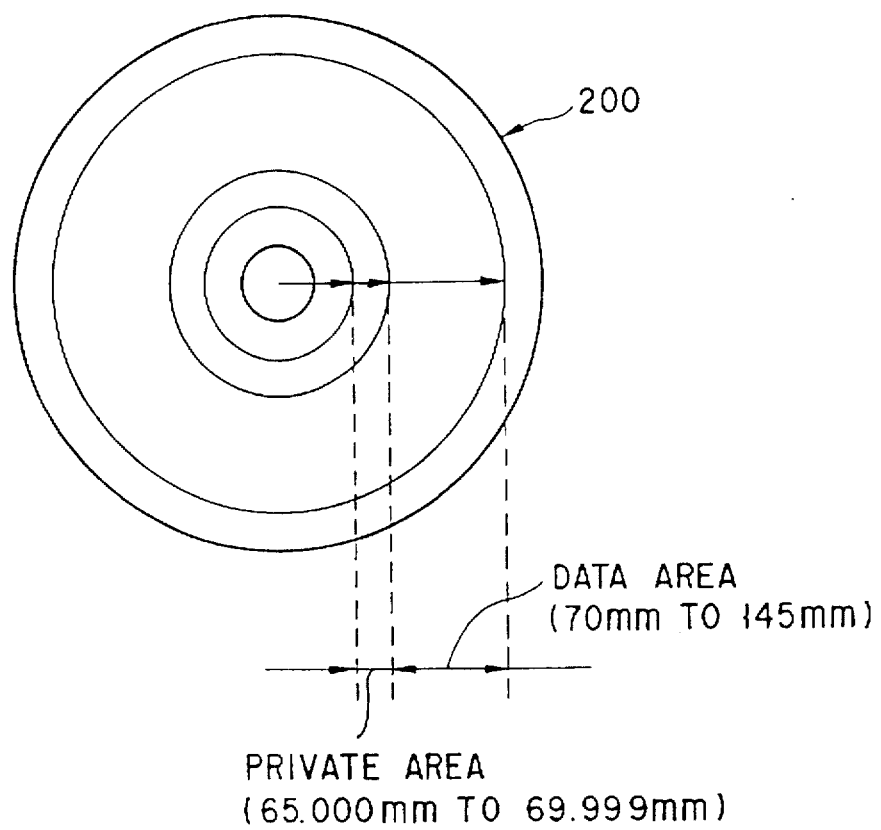
FIG. 7 illustrates peripheral regions on an optical disc where information identifying disc type can be recorded.

FIG. 7 illustrates an optical disc 200 having a nominal diameter of 305 mm. An inner peripheral region (private area) at a distance from the disc center between 65.000 and 69.999 mm and an outer peripheral region (outer region of the data area) at a distance from the center greater than 145 mm are both available for carrying disc type information. The disc type information can be contained in multiple tracks of information, e.g., 100 tracks. Since the pits formed in the substrate for recording the disc type represent laser readable binary data, the medium types can be designated by particular binary values. For example, a phase transformation mode type optical disc can contain a repeating value "0001" in the multiple tracks, while an alloying mode type disc can contain a repeating value "1001". The disc type information can be further refined to include an indication of the recording materials used, thereby enabling distinction among different constructions of alloying mode type discs or phase transformation mode type discs.

In some cases, optical discs are mounted in a protective cartridge case. For example, model no. "A" optical disc manufactured by Toshiba Corporation of Japan is mounted in a cartridge case. When a protective case is so provided, the type of disc mounted therein can be encoded on the cartridge case.

FIG. 8 illustrates a cartridge case 250 in which can be mounted an optical disc of either the phase transformation or alloying mode type. Case 250 includes a shutter 252 which opens to expose the optical disc when the cartridge is inserted into disc recording or reading apparatus. Case 250 also includes two identifiers 4 having identifier holes 254 each of which contains an identifier shutter 256. At the time the disc is mounted in case 250, shutter 256 is set to either block its associated hole 254 or not block it. These shutters are set in a predetermined manner corresponding to the type of the disk contained in the case.

As illustrated in FIG. 9, which shows section 9—9 of FIG. 8, the disc recording apparatus constructed according to the present invention can include a light emitting diode (LED) 5 and a photodetector 7 aligned across opposite sides of each hole 254. Optical path 6 formed between LED 5 and detector 7 is blocked or unblocked by identifier shutter 256. Then, the blocked/unblocked state of each hole 254 can be read to determine the type of disc mounted in case 250.

FIG. 10 diagrammatically illustrates recording apparatus 300 for use in the recording system for recording information on optical discs having associated therewith disc type information such as described above with reference to FIGS. 7 to 9.

Apparatus 300 includes a host central processing unit (CPU) 302 which is connected to a small computer system interface (SCSI) protocol controller 304 via an SCSI bus 306. A buffer memory 308 is connected to receive from SCSI controller 304 data provided by CPU 302 for recording on an optical disc, e.g., an optical disc 310, rotated by a motor 311. A cyclic redundancy check (CRC) code generating circuit 312 generates an error check code corresponding to the data to be recorded.

A data interleaving and error-correcting code (ECC) generating circuit 320 functions to interleave recording data held in buffer 308 and to add thereto an ECC. CRC checking circuit 322 checks the CRC code added by circuit 312 to the data stored in buffer 308. Assuming no error is found in the CRC code check, the data is converted into a modulation code by a modulation circuit 324. A frequency synthesizer circuit 326 generates a recording clock signal and is coupled to circuit 324 to provide the recording clock signal thereto. In the case of MCAV (modified constant angular velocity) modulation the frequency of the recording clock signal is altered in accordance with a control signal representative of the recording location on the optical disc. A playback pattern generating circuit 328 generates VFO, SYNC, RESYNC and other playback control signals which are used at time of playing back the optical disc. These playback control signals are added to the modulation code generated by circuit 324.

A recording pulse width control circuit 330 is connected to receive the modulation code and playback control signals. Circuit 330 generates a recording pulse signal for each recording position on the optical disc.

A laser driver circuit 332 is connected to receive the recording pulse signals generated by circuit 330. A laser recording power control circuit 334 generates a power level control signal representative of an appropriate recording laser power level. A semiconductor laser 336 for generating a recording or playback laser beam is controlled by driver circuit 332. For example, laser 336 can be provided a laser which generates a beam having a wavelength of 830 nm.

Circuit 332 generates a driving electric current which drives laser 336 to generate a laser beam for recording or playback. For a recording operation, circuit 332 generates the driving current in accordance with the recording pulse signals and controls the magnitude of the driving current in accordance with the power level control signal generated by circuit 334. Circuit 332 also generates the driving current for the recording operation in accordance with the recording location on the optical disc.

Circuit 330 controls the generation of each recording pulse signal and circuit 334 generates the power level control signal in accordance with the recording technique used, e.g., the PWM (pulse width modulation) technique or the PPM (pit position modulation), and the recording mode being used, e.g., alloying or phase transformation mode.

An APC (auto power controller) circuit 338 is also connected to control operation of drive circuit 332 and serves to maintain uniformity of the laser beam output power level. APC circuit 338 controls the electric current generated by drive circuit 332 so that the electric current detected by a laser beam strength monitor is uniform.

Laser 336, which is included in an optical head assembly (optical pick-up) 350, generates a laser beam 352. Head 350 includes a beam splitter 354 and an objective lens 356 for focusing laser beam 352 onto optical disc 310. Laser light reflected from optical disc 310, during either recording or playback, passes through beam splitter 354 which provides a split beam portion 358 for detection by a photodetector 360. The signal generated by photodetector 360 in response to beam portion 358 is amplified by a preamplifier 362. During playback the amplified signal provided by preamplifier 362 is representative of information recorded on the optical disc.

Photodetector 360 can be provided with a pair of photosensors to facilitate tracking control of the laser beam during both recording and playback operations. Apparatus and circuitry for providing such tracking control are disclosed in commonly assigned U.S. Pat. No. 5,088,075 which is incorporated herein by reference.

It is noted that the performance of the tracking control technique disclosed in U.S. Pat. No. 5,088,075 is especially enhanced by operation in a recording mode in which recorded portions of the optical disc have a higher reflectance than unrecorded portions, such as in the case of alloying mode optical disc 100 illustrated in FIG. 1. In particular the higher reflectance provides a larger average magnitude reflected beam and corresponding signal which can be advantageously used for tracking control. In contrast, for example, in the conventional pit forming mode of recording, pits of minimal reflectance are formed by the recording laser beam so that the reflected beam has an average lower magnitude. This lower magnitude reflected beam provides a corresponding lower signal level for tracking control In the operation of apparatus 300 to record information on optical disc 310, the information associated with the optical disc to indicate its recording type, e.g., alloying or phase transformation mode, is read. In the case of a disc on which the type information is encoded on the inner or outer periphery of the disc (cf. FIG. 7), the optical head (optical pick-up 350) is initially positioned over the appropriate portion of disc 310 and the type information is read. In the case of a disc mounted in a protective cartridge case which includes identifier holes as described above with respect to FIGS. 8 and 9, apparatus 300 includes the appropriate LEDs (5) and photodetectors (7) to read the disc type information.

The type information is provided to CPU 302 which controls the operations of circuits 330 and 334 in accordance with the recording mode of disc 310. CPU 302 is also provided by the user with information about the recording technique to be used, so that CPU 302 can further control the operations of circuits 330 and 334 in accordance with this information.

For example, when practicing the PWM recording technique, the length of each recorded mark must be carefully controlled. Since recording in either the alloying or phase transformation modes constitutes a thermal recording operation, the operation is governed by thermal properties of the process, including the heat capacity and heat diffusivity of the recording layer.

In view of this, it is not necessarily feasible to directly equate laser emission time with the desired mark length. Instead, it is the present inventors' experience that the desired mark length can be recorded by controlling laser energy, which is a function of the laser beam pulse shape, duration, and power level. The appropriate control of laser energy in this manner is, in turn, a function of the recording mode, e.g., alloying or phase transformation modes. Since CPU 302 initially obtains the disc type information associated with disc 310, it can control circuits 330 and 334 to provide appropriate beam pulse shapes, durations, and power levels in order to assure accurate recording of information. In the case where the amorphous-to-crystalline phase transformation mode is being practiced CPU 302 also controls circuits 330 and 334 to prevent occurrence of the aforementioned retransformation phenomenon.

Thus, in accordance with the present invention there is also provided an optical medium recording system for recording on optical discs of different recording modes, including recording apparatus such as apparatus 300 and the different recording mode type discs on which the apparatus can successfully record information.

An embodiment of the present invention for overcoming structural problems experienced with optical discs, especially problems of mechanical deformation resulting from environmental conditions, is described next. Broadly, in accordance with the present invention, such mechanical deformation can be minimized by aging a disc substrate, following deposition thereon of recording, protecting and resin layers as applicable. Such aging is performed by placing the disc substrate in an environment having conditions causing the disc to experience a deformation approximately midway between the expansion or contraction experienced at the extremes of the anticipated operating environment.

The present embodiment addresses solving this structural problem for a two-sided optical disc 400 having a construction as illustrated in FIG. 11. Disc 400 includes a first plastic substrate 402 and a second plastic substrate 404. Each of substrates 402 and 404 includes a layer of recording material (not shown) deposited thereon. Disc 400 also includes a plastic central reinforcing plate 406. Substrate 402 is attached to central plate 406 using a two-sided adhering sheet 408. Substrate 404 is attached to central plate 406 using a two-sided adhering sheet 410.

In accordance with this embodiment of the invention, mechanical deformation, i.e., expansion and contraction, of the two-sided disc structure, resulting from exposure to a range of anticipated operating environment conditions, can be minimized by environmentally aging each substrate 402 and 404, prior to bonding to central plate 406, in predetermined environmental conditions. The predetermined conditions result in each substrate experiencing a deformation approximately midway between the expansion or contraction experienced at the extremes of the anticipated operating environment conditions.

Vapor deposition or sputtering techniques performed in vacuum are techniques used in the formation of films on the substrate during optical disc construction, such as the steps of forming the recording layer. As a result, the substrates are very dry immediately after the film formation. Therefore, when the substrates are removed from the vacuum chamber and exposed to the environment, they immediately begin to absorb moisture and tend to expand. If this exposure is uncontrolled, the respective substrates will mechanically deform haphazardly. Then, upon bonding to the central plate, the complete two-sided disc will experience unacceptable mechanical deformation upon exposure to the range of environmental conditions of the operating environment. In view of these observations, the present inventors recognized a need to control the environmental conditions to which the individual substrates are exposed after removal from vacuum chamber.

EXAMPLE III

Several discs 400 were constructed. Substrates 402 and 404 for each disc were constructed generally according to the method described above with respect to the construction of disc 100 (FIG. 1), except that no resin layer (114) was applied. In particular, each substrate was formed by injection molding of PMMA, and had a diameter of approximately 300 mm and a thickness of approximately 1.5 mm. A first protective layer of $(ZnS)_{80}(SiO_2)_{20}$ was deposited on the substrate. Recording layers of $Ge_{22}Sb_{22}Te_{56}$ and $Bi_2Te_3$ were successively deposited on the protective layer. A second protective layer of $(ZnS)_{80}(SiO_2)_{20}$ was deposited over the recording layer. The individual substrates were aged in a manner more fully described below prior to final assembly of disc 400. In this example, central plate 406 was formed by casting of PMMA, to have a diameter of approximately 300 mm and a thickness of approximately 3 mm. Each two-sided adhering sheet 408, 410 was composed of a silicone adhesive, and was adhered to the adjacent substrate and central plate surfaces.

FIG. 12 illustrates a plot of the amount of expansion or contraction experienced by one of the prepared substrates as a function of time, upon exposure to conditions of 50° C. and 90% relative humidity (RH) and then exposure to conditions of 20° C. and 10% RH. As used herein, expansion or contraction is measured as surface movement on the disc detected by the apparatus of measuring a disk deformation.

In FIG. 12, the two sets of environmental conditions were selected as representative of extremes of the anticipated operating environment conditions of an optical disc. As seen in FIG. 12, the substrate experienced a maximum reversible expansion or contraction of approximately 1 mm between the extreme conditions. Thus a midpoint deformation midway between the deformations at the extreme conditions was approximately 0.5 mm.

Figure 13:
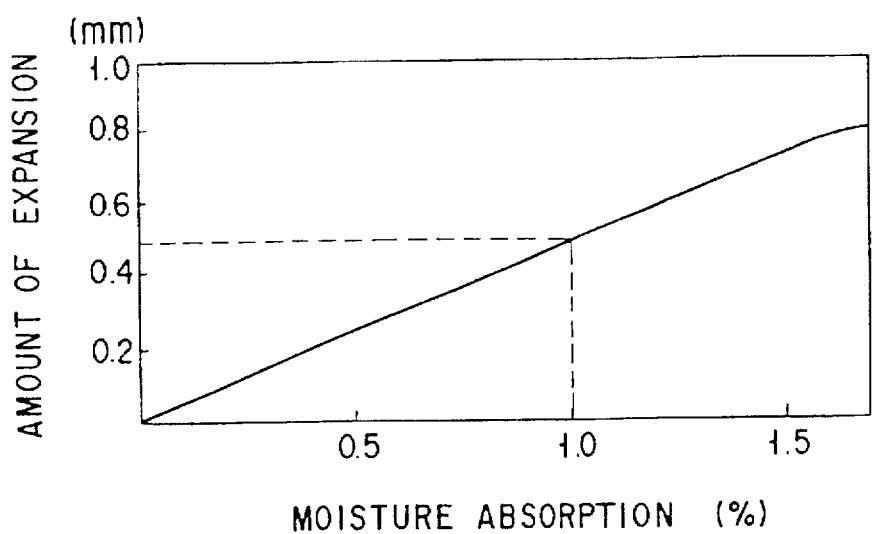
FIG. 13 illustrates a plot of optical disc substrate expansion as a function of moisture absorption.

FIG. 13 illustrates a plot of the amount of expansion of the substrate experienced due to moisture absorption at a fixed temperature. As noted in FIG. 13, the midpoint deformation of 0.5 mm occurred at a moisture absorption of approximately 1.0%.

Figure 14:
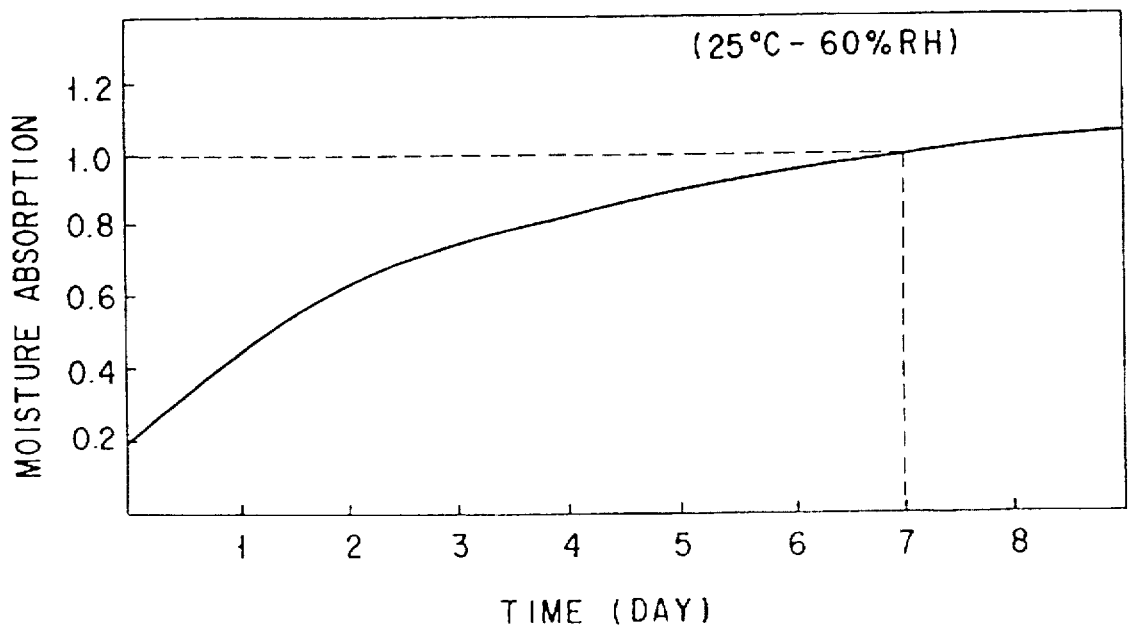
FIG. 14 illustrates a plot of moisture absorption by an optical disc substrate as a function of time.
Figure 15A:
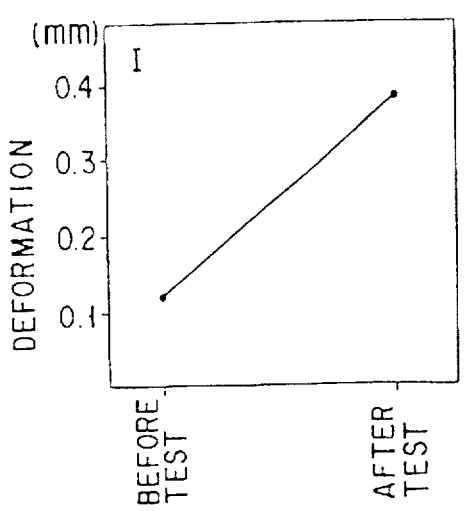
FIGS. 15A–15F illustrate plots of expansion of two-sided optical discs before and after exposure to a predetermined environment for six different optical discs, respectively.
Figure 15B:
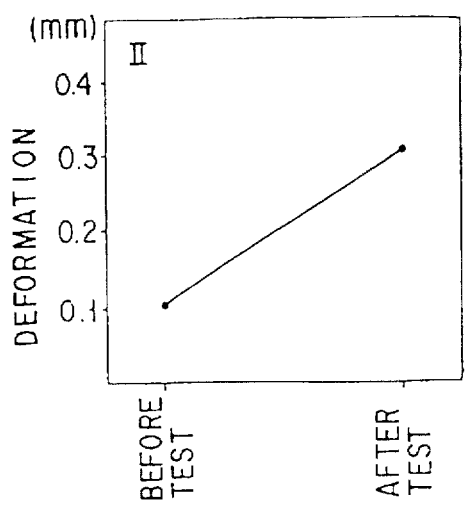
Figure 15C:
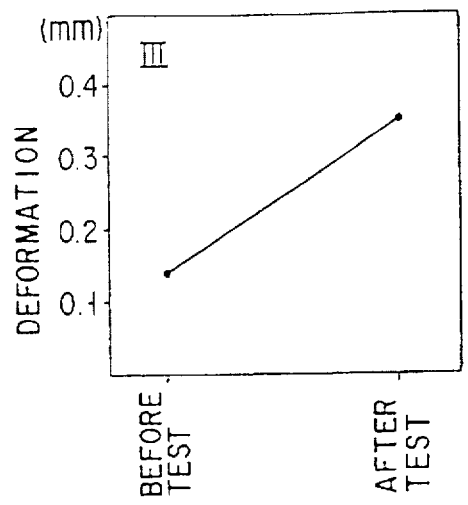
Figure 15D:
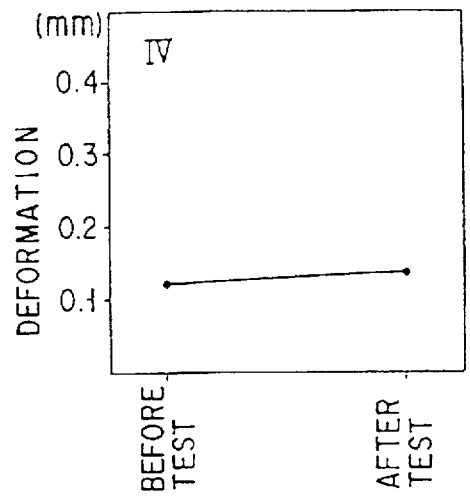
Figure 15E:
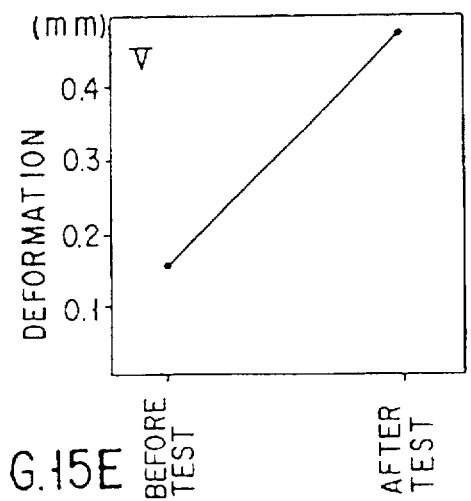
Figure 15F:
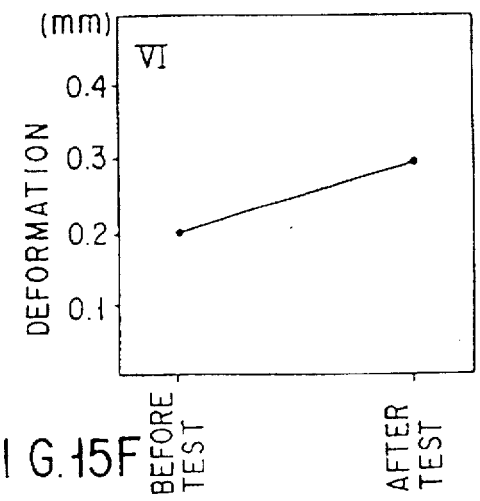

FIG. 14 illustrates a plot of moisture absorption experienced by the substrate as a function of time under the fixed environmental conditions of 25° C. and 60% RH. As seen in FIG. 14, an initially dry substrate absorbed 1% moisture, which corresponds to the midpoint deformation of 0.5 mm, in approximately 7 days under the fixed environmental conditions.

Substrates were aged in the fixed conditions of 25° C. and 60% RH for various durations. Also, two substrates were aged in an environment of 50° C. and 90% RH for 20 days. The deformation experienced by each substrate was measured. Then the substrates were paired to form six pairs and were bonded to the central plate. Table I below describes the moisture absorptions, due to aging, of the respective substrates of each pair.

TABLE I (Note *1)

| Pair no. | 1st substrate moisture absorbed | 2nd substrate moisture absorbed |
| --- | --- | --- |
| 1 | 0.2% | 0.2% |
| 2 | 0.7% | 0.7% |
| 3 | 0.2% | 0.7% |
| 4 | 1.0% | 1.0% |
| 5 | 1.0% | 0.2% |
| 6 | 1.5% | 1.5% |

(Note *1: Only pair no. 6 was aged at 50° C. and 90% RH.)

Each pair was then bonded to a common central plate. Each completed two-sided disc was subsequently placed in an environment of 50° C. and 90% RH for 20 days. The deformation of each completed two-sided disc was measured before and after the 20 days exposure to the 50° C. and 90% RH environment.

FIGS. 15A–15F are plots of the deformation before and after this exposure for pairs nos. 1–6, respectively. As can be seen, pair no. 4 (FIG. 15D) experienced the minimum change in deformation upon exposure to this condition. As noted above, pair no. 4 was composed of substrates each aged to a deformation corresponding to the midpoint of the extremes of the anticipated operating environment.

EXAMPLE IV

The suitability of silicone adhesive as compared to acrylic adhesive for use in bonding two-sided adhering sheets 408 and 410 to adjacent substrate and central plate surfaces was studied. Each of the adhesives was heated in an inert gas and the resulting decomposition products were evaluated. It was observed that the silicone adhesive had a higher temperature of decomposition product production than acrylic adhesive. Therefore, it is expected that the silicone adhesive generates fewer decomposition product in the environment of high temperature, at which the optical disc medium would be stored.

An embodiment of the the present invention for overcoming structural problems with optical discs, especially relating to adhesion between a plastic substrate and an inorganic dielectric protective layer deposited thereon, is described next. Optical discs can be constructed with a substrate formed of an organic material, e.g., a plastic material such as an acrylic or polycarbonate. When the recording layer of such discs includes materials such as Ge, Sb, Te, Bi, or Pb, Ag, Pd, it is desirable to provide a dielectric inorganic protective layer between the organic substrate and the recording layer. The protective layer isolates the recording layer to prevent a corrosive effect on the recording layer that may otherwise result from direct contact between the organic substrate and the recording layer.

Layer 104 of optical disc 100 (FIG. 1) is an example of such a protective layer. The protective layer can be provided as consisting of $SiO_2$, ZnS, SiN, $Al_2O_3$ or a mixture of these components. Possible mixtures are included in the ranges: $(ZnS)_{80}(SiO_2)_{20}$ to $(ZnS)_{20}(SiO_2)_{80}$, $(ZnS)_{80}(SiN)_{20}$ to $(ZnS)_{20}(SiN)_{80}$, and $(ZnS)_{80}(Al_2O_3)_{20}$ to $(ZnS)_{20}(Al_2O_3)_{80}$.

As previously described there is a need to improve adhesion between the inorganic protective layer and the organic substrate. In accordance with the present invention, adhesion between the inorganic protective layer and organic substrate is greatly improved by adding a hydrocarbon polymer material to the inorganic layer. In accordance with an embodiment, this inorganic protective layer is deposited by sputtering in a sputtering chamber such as in the manner described above for the deposition of layer 104 of disc 100. However, in order to add a hydrocarbon polymer to the protective layer, after pumping to create a suitable vacuum and prior to commencement of sputtering, an inert gas and a hydrocarbon gas are introduced into the sputtering chamber. Then the sputtering is commenced in the presence of the gaseous mixture including the hydrocarbon gas. As a result, the protective layer as deposited is a mixture of the inorganic material and a hydrocarbon polymer formed from the hydrocarbon gas. The protective layer so deposited has a stronger adhesive bond to the plastic substrate than achieved without introduction of the hydrocarbon material. It is believed the stronger adhesive bond may result from the hydrocarbon polymer in the protective layer bonding with the organic material of the substrate.

The above described method for deposition of layer 104 of disc 100 can be modified in the following manner to add a hydrocarbon polymer to the inorganic layer. With reference to FIG. 2, after operation of cryo pump 126 to achieve the desired degree of vacuum, e.g., $1 \times 10^{-5}$ Torr, argon gas is introduced into chamber 122 through line 128 and a hydrocarbon gas is introduced through line 130. The hydrocarbon gas can be selected from such hydrocarbon gases as methane, ethane, propane, or butane, although methane is preferred. The gases are introduced in proportions such that the hydrocarbon gas is 5% to 50% of the gas mixture, and preferably 5% to 20% in the case of methane. The gases are introduced such that the pressure in chamber 122 rises to no more than 0.1 Torr. Increasing the gas pressure above 0.1 Torr can adversely affect the sputtering operation. Once the desired gaseous atmosphere has been established, the sputtering commences as previously described and the mixture of inorganic material and hydrocarbon polymer is deposited as protective layer 104.

During actual practice of the above described deposition method, it was observed that the rate of formation of layer 104 is reduced if the proportion of hydrocarbon gas is increased above 50%.

EXAMPLE V

Sample optical disc structures were prepared by the following method utilizing a sputtering apparatus having three cathode targets. Thus, the sputtering apparatus can be diagrammatically represented by apparatus 120 in FIG. 2 except for provision of three targets. A first target consisted of a mixture of ZnS and $SiO_2$ in a molar ratio of ZnS:$SiO_2$= 70:30, for depositing the protective layer. A second target consisted of a mixture of GeTe and $Sb_2Te_3$ in a molar ratio of GeTe:$Sb_2Te_3$=2:1, for depositing a first recording layer on the protective layer. A third target consisted of a mixture of $Bi_2Te_3$.

An acrylic resin substrate was provided on which the protective layer was deposited by sputtering. After evacuating the vacuum chamber to a vacuum of the order of approximately $1 \times 10^{-5}$ Torr, argon and methane gases were fed into the chamber and had a gas pressure of approximately $5 \times 10^{-3}$ (or 0.005) Torr. For the respective samples, the proportion of methane was set at 0%, 10%, 30% or 50%. The deposition by sputtering of the first target proceeded in the presence of the gaseous mixture of argon and methane. As a result, the protective layer was deposited as a mixture of $(ZnS)_{70}(SiO_2)_{30}$ and a hydrocarbon polymer. The protective layer was deposited to a thickness of approximately 40 nm.

Next the vacuum chamber was evacuated to $1 \times 10-5$ Torr and only argon gas was fed to a pressure of approximately 0.005 Torr. In this argon gas atmosphere, the second target was sputtered to deposit the first recording layer as $Ge_2Sb_2Te_5$ to a thickness of approximately 40 nm.

Following deposition of the first recording layer, the vacuum chamber was again evacuated to $1 \times 10^{-5}$ Torr and only argon gas was fed up to a pressure of approximately 0.005 Torr. In this argon gas atmosphere, the third target was sputtered to deposit the second recording layer as $Bi_2Te_3$ being of the order of approx. 30 nm thick.

Each sample disc structure prepared by the above described method was then subjected to an adhesion test to assess the degree of adhesion between the substrate and the protective layer. The adhesion test consisted of scoring, i.e., cutting, the recording and protective layers to form 50 portions each approximately 5 mm×5 mm, covering the 50 portions with a piece of adhesive tape, peeling off the adhesive tape, and observing the number of portions of recording and protective layers which separated from the substrate.

When the adhesion test was performed on the sample disc structures, it was observed that on the sample for which the methane gas flow was 0%, some of the 50 portions was peeled away. On all samples in which the methane gas flow was more than 0%, none of the 50 portions peeled away. On the sample for which the methane gas flow was 0%, the surface of the substrate at the peeled away portion was analyzed by X-ray photoelectron spectroscopy. This analysis has indicated no peaks indicating Zn, S or Si. This appears to indicate that the protective layer was completely removed by the peeled adhesive tape in this portion.

EXAMPLE VI

Protective films were formed using different proportions of methane gas relative to argon gas to determine the effect of the proportion on the rate of film formation. Each film was deposited by the method described in Example V, but on to a glass substrate to enable film thickness measurement using a surface profile meter. Methane proportions of 0%, 10%, 30%, 50%, and 70% were used on respective samples.

Figure 16:
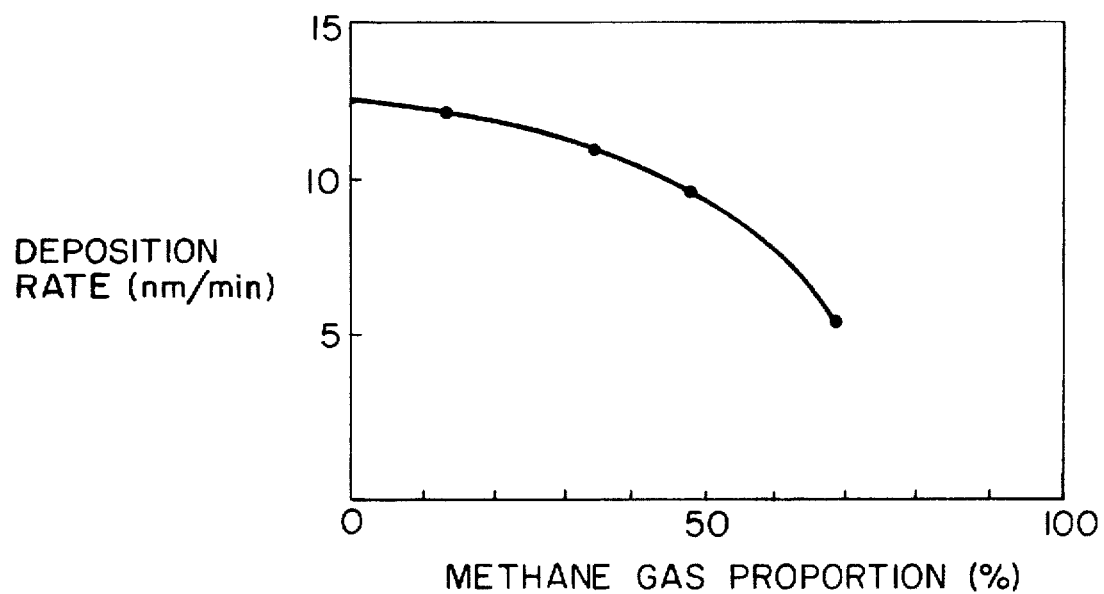
FIG. 16 illustrates a plot de protective layer deposition rate as a function of methane gas proportion.

The results of the measurements are illustrated in FIG. 16 in which protective film deposition rate in nm/min unit is plotted as a function of methane proportion. As seen in FIG. 16, the deposition rate decreases at a greater rate for methane proportions greater than 50%.

EXAMPLE VII

A sample optical disc having a protective layer including hydrocarbon polymer, between the substrate and recording layer, was prepared to determine whether the presence of the hydrocarbon polymer adversely affected the quality of recorded information. The sample included a polycarbonate substrate having tracking grooves formed therein with a track pitch of 1.6 μm. A first protective layer of $(ZnS)_{70}(SiO_2)_{30}$ was deposited in 20 nm thick approx. by sputter, in an atmosphere of argon and 20% methane, in accordance with the method described above for Example V. Recording layers of $Ge_{22}$—$Se_{22}$—$Te_{56}$ and $Bi_2$—$Te_3$ deposited in 40 nm and 30 nm thick, respectively, in accordance with example V. A second protective layer having the same composition as the first protective layer was deposited by sputtering in approx. 20 nm thick over the recording layer. An ultraviolet cured resin layer of the same type as layer 114 of disc 100 (FIG. 1) was applied in several microns thick by spin coating to a thickness of several microns.

Information was recorded on the sample using various recording laser power levels. The C/N was measured using a carrier signal frequency of 3.7 MHz and a resolution of bandwidth of 30 kHz. The linear velocity of the disc during recording and playback was kept at 6 m/sec, the record/playback laser wavelength was 830 nm and the objective lens with a numerical aperture of 0.55.

Figure 17:
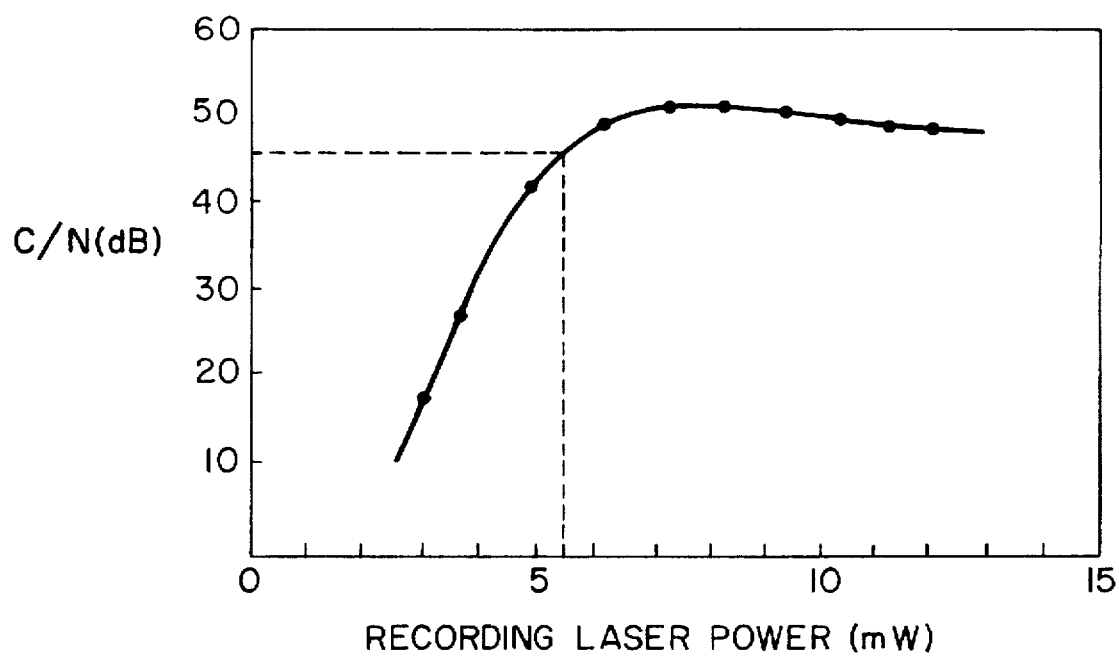
FIG. 17 illustrates a plot of C/N as a function of recording laser power for an optical disc having a protective layer including a hydrocarbon polymer.

FIG. 17 illustrates the C/N ratio plotted as a function of recording laser power level. The plot in FIG. 17 demonstrates satisfactory recording quality when a hydrocarbon polymer is included in the protective layer between the substrate and the recording layer.

An embodiment of the present invention for overcoming structural problems with optical discs, especially relating to adhesion between a resin layer and an inorganic protective layer, is described next.

Optical discs can be constructed with an inorganic dielectric protective layer deposited over the recording layer and an organic resin layer deposited over the protective layer. The dielectric protective layer is provided over the recording layer to prevent corrosion of the recording layer. The resin layer is provided for mechanical protection of the recording layer. An example of such a construction is provided in disc 100 (FIG. 1) in which inorganic protective layer 112 is deposited over recording layer 106 and resin layer 114 is deposited over layer 112.

As previously described, there is a need to improve adhesion between the inorganic protective layer and the organic resin layer. In accordance with the present invention, adhesion between these layer is greatly improved by interposing therebetween an organic plasma polymer film.

Figure 18:
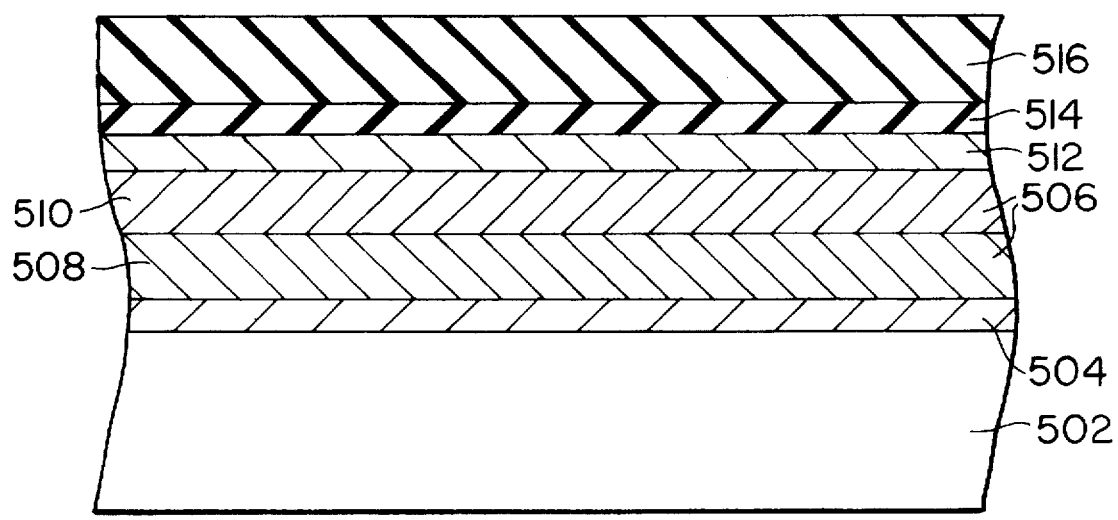
FIG. 18 illustrates a sectional view of an optical disc constructed in accordance with an embodiment of the invention and including a plasma polymer layer between a second protective layer and a resin layer.

FIG. 18 illustrates a sectional view of an optical disc 500 constructed in accordance with an embodiment of the present invention to include an organic plasma polymer film. Disc 500 includes a substrate 502 composed of a plastic material such as acrylic or polycarbonate. A first inorganic dielectric protective layer 504 is deposited on substrate 502. A recording layer 506 is deposited on layer 504 and consists of two sublayers 508 and 510. Sublayer 508 can be deposited in the same manner as layer 108 of disc 100 (FIG. 1), e.g., by sputtering $Ge_{22}Sb_{22}Te_{56}$ to a thickness of approximately 40 nm. Sublayer 510 can be deposited by sputtering in the same manner as layer 110 of disc 100, e.g., $Bi_2Te_3$ deposited to a thickness of approximately 30 nm. Recording layer 506 is so constructed to enable recording on disc 500 in the alloying mode.

A second inorganic dielectric protective layer 512 is deposited over recording layer 506. Protective layers 504 and 512 can each be provided as consisting of $SiO_2$, ZnS, SiN, $Al_2O_3$ or one of the above described mixtures of these materials. Each of layers 504 and 512 is deposited by sputtering in a manner and to a thickness as previously described herein.

Disc 500 also includes an organic plasma polymer layer 514 on protective layer 512. Layer 514 is formed in the same sputtering system used for depositing layers 504–512, by introducing a hydrocarbon gas to which capacitively coupled RF power is applied across plate electrodes such a deposition technique being known in the art as an easy method for plasma polymer formation. Alternatively, the hydrocarbon gas can be introudced to which inductively coupled RF power is also applied. Suitable hydrocarbon gases for formation of plasma polymer layer 514 include methane, ethane, propane, or butane. A plasma polymer layer can also be formed with components of carbon, hydrogen and nitrogen by mixing $N_2$ and/or $NH_3$ with methane gas. Layer 514 is formed to a thickness of approximately 5 nm to 100 nm and preferably 30 nm to 100 nm.

As a final step, a resin layer 516 is deposited over plasma polymer layer 514. Layer 516 can have the same composition and thickness and can be deposited by the same method as described for the deposition of layer 114 of optical disc 100 (FIG. 1).

Layer 516 has a satisfactory adhesive bond to layer 514. The present inventors believe this satisfactory bond may be achieved because both materials are organic. Plasma polymer layer 514 also forms a satisfactory adhesive bond with inorganic protective layer 512. It is believed that the plasma deposition technique employed to deposit layer 514 causes a molecular reaction, promoting molecular bonding, between the fragments produced by the plasma and inorganic layer 512. As a result, plasma polymer layer 514 forms a stronger bond with layer 512 than would the resin layer if it were instead directly deposited on layer 512 by spin coating. (Note: fragments mean some kinds of decomposition products of starting gas molecule such as $CH_3$, $CH_2$, CH and H. These fragments are electrically neutral in state (radical) so that their chemical reactivity between the underlayer would be rather strong.) Since resin layer 516 also forms a satisfactory bond with layer 514, the bonding of layer 516 in disc 500 is superior to that found in conventoinal disc constructions.

EXAMPLE VIII

A plasma polymer film was deposited on an inorganic layer composed of ZnS and $SiO_2$. The deposition was carried out in a vacuum state less than $1 \times 10^{-5}$ Torr into which methane gas was introduced at 20 sccm while a pressure of 0.01 Torr was maintained. Capacitively coupled RF source of 70 W was utilized for the deposition of the plasma polymer film.

An optical disc according to the present invention has been described as including a recording layer having sublayers of Ge—Sb—Te and Bi—Te.

In accordance with embodiments of the invention, when the disc is provided with a substrate composed of plastic, a first inorganic dielectric protective layer is preferably provided between the substrate and recording layer. A second inorganic dielectric protective layer can also be provided over the recording layer. While each of these protective layers is preferably provided as a mixture in the range from $(ZnS)_{80}(SiO_2)_{20}$ to $(ZnS)_{20}(SiO_2)_{80}$, the invention can be successfully practiced with either or both of the protective layers composed of mixtures in the ranges $(ZnS)_{80}(SiN)_{20}$ to $(ZnS)_{20}(SiN)_{80}$ and $(ZnS)_{80}(Al_2O_3)_{20}$ to $(ZnS)_{20}(Al_2O_3)_{80}$, as well as being composed of any one of $SiO_2$, ZnS, SiN and $Al_2O_3$.

Further, in the case that the substrate is not plastic but is instead an inert material such as glass against the penetration of water moisture, then the alloying mode disc construction according to the present invention can be provided without provision of at least the first protective layer.

Further, the alloying mode disc constructed according to the present invention can also advantageously include the features described above for overcoming structural problems experienced with conventional optical discs.

While an embodiment describing an aging technique used in the construction of a two-sided optical disc has been disclosed, the invention is not so limited. The aging technique broadly set forth herein is effective for adapting other optical disc structures for use in anticipated operating environments, including discs having a single substrate and two-sided discs which do not include a central reinforcing plate.

While each of the embodiments of the present invention directed to overcoming structural problems with optical discs has been described with respect to optical discs including particular recording layer materials, the invention is not so limited. Each of these embodiments can be successfully practiced to overcome the above described structural problems experienced with conventional optical discs, without regard for particular recording layer materials or disc recording mode type.

Recording apparatus 300 has been described with respect to enabling recording with a single apparatus on alloying and phase transformation mode type discs. However, it will now be recognized by those skilled in the art that in accordance with the present invention all types of optical media can be constructed to have associated therewith, specific information about the type of disc and any other parameters relevant to the means by which a recording laser beam can be most effectively controlled to optimize recording on such media.

The foregoing description of the preferred embodiments and examples of the invention have been presented for purposes of illustration and description. It is not intended to be exhaustive or to limit the invention to the precise form disclosed, and modifications and variations are possible in light of the above teachings or may be acquired from practice or the invention. The embodiments were chosen and described in order to explain the principles of the invention and its practical application to enable one skilled in the art to utilize the invention in various embodiments and with various modifications as are suited to the particular use contemplated. It is intended that the scope of the invention to be defined by the claims appended hereto, and their equivalents.

We claim:

1. An optical recording medium for recording information, comprising:
    an organic substrate;
    a recording layer comprising a first sublayer disposed on a predetermined portion of the substrate and a second sublayer disposed on the first sublayer;
    the first sublayer being substantially composed of a mixture of Ge, Sb, and Te, and the second sublayer being substantially composed of a mixture of Bi and Te;
    a first inorganic protective layer between the recording layer and the substrate;
    a second inorganic protective layer disposed on the second sublayer; and
    an organic plasma polymer film disposed on the second inorganic protective layer.

2. The optical recording medium of claim 1, wherein the first sublayer has a thickness in the range of 30 nm to 60 nm, and the second sublayer has a thickness in the range of 20 nm to 50 nm.

19

3. The optical recording medium of claim 1, wherein the first sublayer further comprises a material with a composition on a line connecting $Sb_2Te_3$ and GeTe on a ternary Ge—Sb—Te composition diagram.

4. The optical recording medium of claim 1 or 3, wherein the second sublayer comprises a material with a composition of $Bi_2Te_3$.

5. The optical recording medium of claim 1, wherein each of the first and second protective layers comprises a material selected from the group consisting of $(ZnS)_{80}(SiO_2)_{20}$ to $(ZnS)_{20}(SiO_2)_{80}$, $(ZnS)_{80}(SiN)_{20}$ to $(ZnS)_{20}(SiN)_{80}$ and $(ZnS)_{80}(Al_2O_3)_{20}$ to $(ZnS)_{20}(Al_2O_3)_{80}$.

6. An optical recording medium for recording information comprising:

an organic substrate;

a first inorganic protective layer disposed on the substrate comprising a material selected from the group consisting of $(ZnS)_{80}(SiO_2)_{20}$ to $(ZnS)_{20}(SiO_2)_{80}$, $(ZnS)_{80}(SiN)_{20}$ to $(ZnS)_{20}(SiN)_{80}$ and $(ZnS)_{80}(Al_2O_3)_{20}$ to $(ZnS)_{20}(Al_2O_3)_{80}$;

a recording layer comprising a first sublayer disposed on a predetermined portion of the substrate and a second sublayer disposed on the first sublayer;

the first sublayer comprising a material with a composition on a line connecting $Sb_2Te_3$ and GeTe on a ternary Ge—Sb—Te composition diagram;

the second sublayer comprising a material with a composition of $Bi_2Te_3$;

a second inorganic protective layer disposed on the recording layer comprising a material selected from the group consisting of $(ZnS)_{80}(SiO_2)_{20}$ to $(ZnS)_{20}(SiO_2)_{80}$, $(ZnS)_{80}(SiN)_{20}$ to $(ZnS)_{20}(SiN)_{80}$ and $(ZnS)_{80}(Al_2O_3)_{20}$ to $(ZnS)_{20}(Al_2O_3)_{80}$;

an organic plasma polymer film disposed on the second protective layer; and a resin layer disposed on the organic plasma polymer film.

7. An optical recording medium for recording information, comprising:

an organic substrate;

a first protective layer disposed on at least a portion of the substrate;

a layer of recording material disposed on the protective layer; and the first protective layer comprising an inorganic material and a second organic material for enhancing bonding between the protective layer and the substrate, wherein the inorganic material comprises a material selected from the group consisting of $(ZnS)_{80}(SiO_2)_{20}$ to $(ZnS)_{20}(SiO_2)_{80}$, $(ZnS)_{80}(SiO_2)_{20}$ to $(ZnS)_{20}(SiO_2)_{80}$ and $(ZnS)_{80}(Al_2O_3)_{20}$ to $(ZnS)_{20}(Al_2O_3)_{80}$, and the second organic material is a hydrocarbon.

a second inorganic protective layer disposed on the recording material; and an organic plasma polymer film disposed on the second inorganic protective layer.

8. The optical recording medium of claim 7, wherein the recording layer includes a first sublayer of Ge—Sb—Te disposed on the protective layer and a second sublayer of Bi—Te disposed on the first sublayer.

20

9. The optical recording medium of claim 7, wherein the second protective layer comprises substantially the same composition as the first protective layer.

10. An optical recording medium for recording information, comprising:

a substrate;

a first inorganic protective layer;

a recording layer between the substrate and the first protective layer;

a second inorganic protective layer disposed on the recording layer;

an organic plasma polymer film disposed on the protective layer; and an acrylic ultraviolet cured resin disposed on the polymer film.

11. The optical recording medium of claim 10, wherein the resin protecting layer has a thickness of 5 µm to 20 µm.

12. The optical recording medium of claim 10, wherein the polymer film has a thickness of 30 nm to 100 nm.

13. An optical recording medium for recording information, comprising:

substrate;

a first inorganic protective layer of a material selected from the group consisting of $(ZnS)_{80}(SiO_2)_{20}$ to $(ZnS)_{20}$ $(SiO_2)_{80}$, $(ZNS)_{80}(SiN)_{20}$ to $(ZnS)_{20}(SiN)_{80}$, and $(ZnS)_{80}(Al_2O_3)_{20}$ to $(ZnS)_{20}(Al_2O_3)_{80}$;

a recording layer between the substrate and the protective layer;

a second inorganic protective layer disposed on the recording layer;

an organic plasma polymer film disposed on the second protective layer; and an organic resin protecting layer disposed on the polymer film.

14. The optical recording medium of claim 13, wherein the resin protecting layer is composed of an acrylic ultraviolet cured resin.

15. An optical recording medium for recording information, comprising:

an organic substrate;

a first protective layer disposed on the substrate;

a second protective layer;

a recording layer between the first protective layer and the second protective layer, said recording layer including a first sublayer of Ge—Sb—Te disposed on the first protective layer and a second sublayer of Bi—Te disposed on the first sublayer;

an organic plasma polymer film disposed on the second protective layer; and an organic resin protecting layer disposed on the polymer film, said organic resin protecting layer comprising an acrylic ultraviolet cured resin.

16. The optical recording medium of claim 15, wherein the protective layers comprise a material selected from the group consisting of $(ZnS)_{80}(SiO_2)_{20}$ to $(ZnS)_{20}(SiO_2)_{80}$, $(ZnS)_{80}(SiN)_{20}$ to $(ZnS)_{20}(SiN)_{80}$ and $(ZnS)_{80}(Al_2O_3)_{20}$ to $(ZnS)_{20}(Al_2O_3)_{80}$.

* * * * *

UNITED STATES PATENT AND TRADEMARK OFFICE
CERTIFICATE OF CORRECTION

PATENT NO. : 5,796,708
DATED : August 18, 1998
INVENTOR(S) : Hideki OHKAWA et al.

It is certified that error appears in the above-indentified patent and that said Letters Patent is hereby corrected as shown below:

Claim 13, Column 20, line 23, insert --a-- before "substrate".

On the title page, item [86], lines 2 and 3 of "PCT No.", delete "Nov. 8, 1995", and insert therefor --Dec. 8, 1995--.

Item [57], line 7 of Abstract, "readably" should read --readable--.

Signed and Sealed this

Fourth Day of May, 1999

Attest:

Q. TODD DICKINSON

*Attesting Officer*          *Acting Commissioner of Patents and Trademarks*